United States Patent [19]
Domme

[11] Patent Number: 5,505,892
[45] Date of Patent: Apr. 9, 1996

[54] PROCESS FOR THE MANUFACTURE OF A FILTER UNIT

[75] Inventor: Alois Domme, Rot, Germany

[73] Assignee: Isfried Domme, Memmingerberg, Germany

[21] Appl. No.: 9,826

[22] Filed: Jan. 27, 1993

[30] Foreign Application Priority Data

Jan. 29, 1992 [CH]  Switzerland ................ 00248/92

[51] Int. Cl.⁶ .................................. B01D 39/16
[52] U.S. Cl. ............ 264/29.6; 210/490; 210/502.1; 210/510.1; 264/29.5; 264/112; 264/122
[58] Field of Search ............... 210/502.1, 506, 210/510.1, 490; 264/29.5, 122, 29.6, 112; 55/524; 502/437

[56] References Cited

U.S. PATENT DOCUMENTS

| | | | |
|---|---|---|---|
| 4,124,529 | 11/1978 | Juntgen et al. | 502/437 |
| 4,664,683 | 5/1987 | Degen et al. | 264/122 |
| 5,064,534 | 11/1991 | Busch et al. | 210/266 |

FOREIGN PATENT DOCUMENTS 3105887  7/1983  Germany.

*Primary Examiner*—Ivars Cintins

[57] ABSTRACT

The manufacturing process for a filter unit made as an adsorbent moulded element provides for the dry mixing of granules of an adsorbent medium, especially activated carbon, and a granular organic thermoplastic binder medium. The dry mixture is then placed in a mould and compacted. As far as possible, air is excluded from the mixture in the mould when the mixture is heated to a temperature well above the plastic range of the binder medium, and kept at that temperature until carbonization and at least partial coking of the binder medium occur. The moulded element is left to cool and is then removed from the mould. Typically, in a filter unit made in this manner, with an entry side and an exit side for the filtrate, the granules of the adsorbent medium in the adsorbent element are fixed in the residual structure of the carbonized and openpored, partially coked organic binder medium having micropores. The adsorbent element may be contained between close-fitting supporting walls on the entry and exit sides respectively. The supporting walls may be made as sintered elements and may serve as mechanical fine filters.

11 Claims, 1 Drawing Sheet

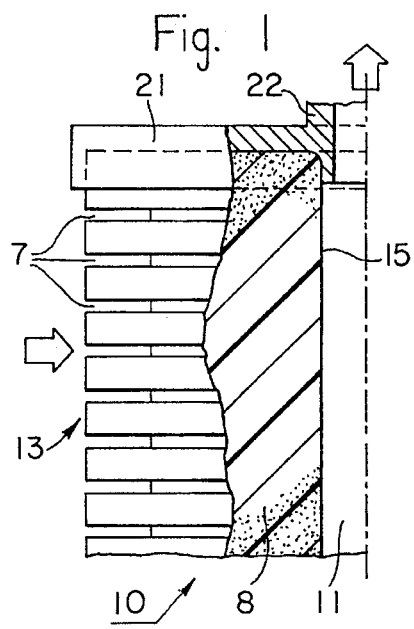
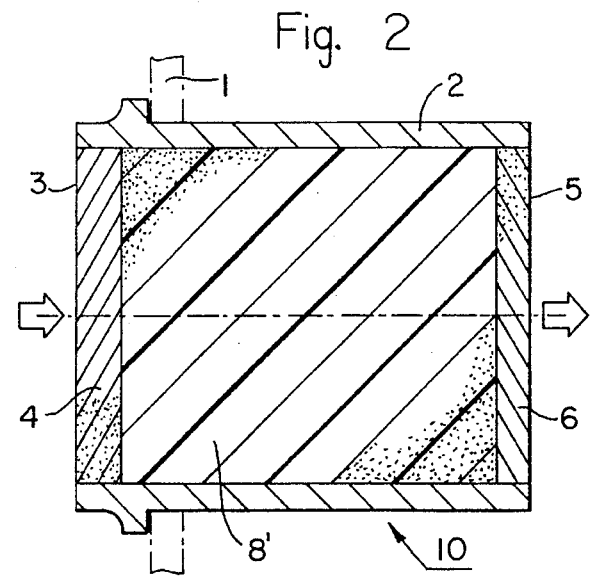
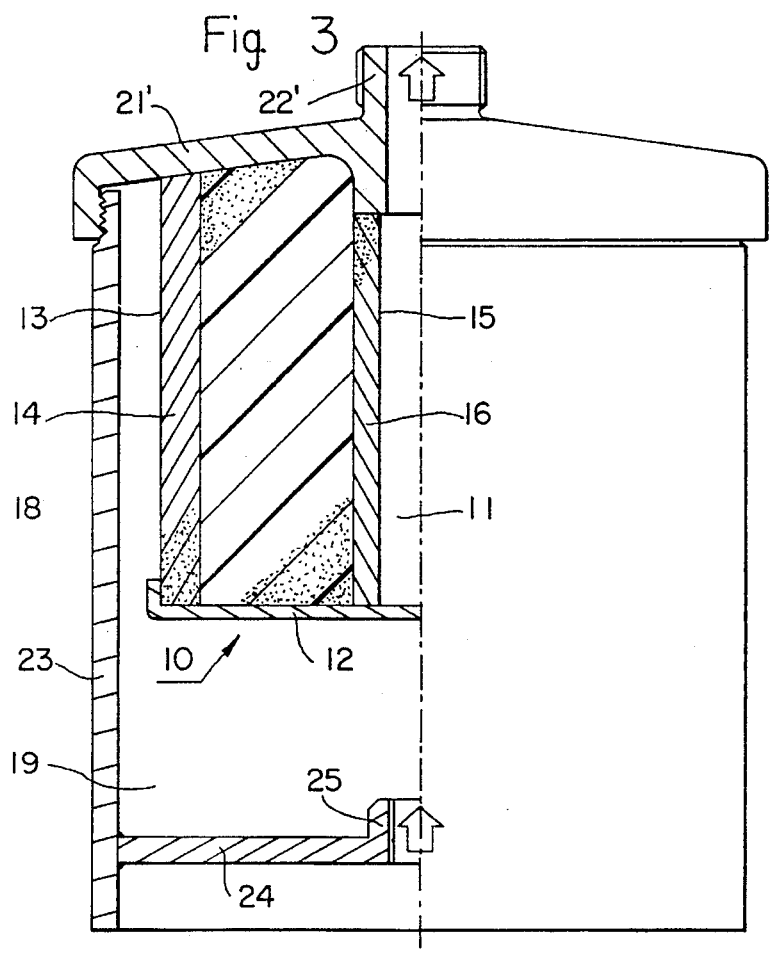
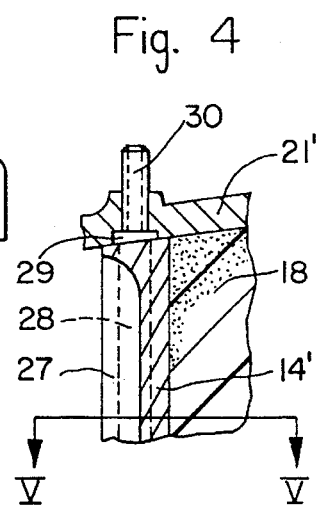
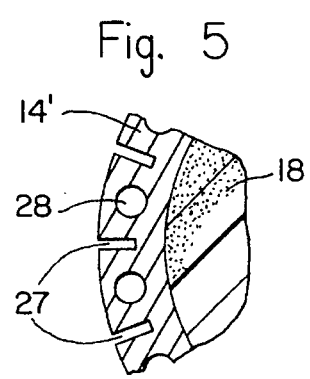

PROCESS FOR THE MANUFACTURE OF A FILTER UNIT

BACKGROUND OF THE INVENTION

The present invention refers to a process for the manufacture of a filter unit made as a moulded adsorbent element permeable to gases and liquids, and to a filter unit manufactured by such process.

PRIOR ART

There are many forms of filters known for filtering liquids or gases. In one type of such filters, as described in DE-A-32 04 022, a loose filling of granules of an adsorbent medium such as activated carbon is placed between a pair of porous walls that retain the granular material. Because in this type of filter there is no kind of internal cohesion of the granulate, its flow and filtering properties in use are difficult to check: due to the flow of filtrate, or due to vibration, some of the granular material of a certain grain size may dislocate or collect in certain areas, and fine material may wash out or coagulate locally and clog to block the passage of filtrate, etc. Above all, though the "internal porosity" of the granules of filter material is in fact given, the extent to which the granulate's adsorbent capacity becomes effective may be rather limited because most of the filtrate flows past the bulk of filter material through the interstices between the granules, and thus virtually comes into superficial contact only with the filter's granulate particles. As a rule, filter units of this kind (also known as filter cartridges or candles) either have to be replaced after a relatively short period of use, or their charge of granulate must be renewed.

Another type of filter, intended for filtering piped water, is described in EP-A-0 253 132. This filter has a moulded adsorbent filter element made as a self-supporting sintered body of a finely distributed adsorbent medium, a thermoplastic binder medium, and oligodynamic material. In the production of the sintered element by thermoplastic sintering, a large proportion of the surface area of the granules and of the micropores in the adsorbent medium is blocked or clogged by the thermoplastic material that adheres to or penetrates into the granules, hence the corresponding internal surface area of the granules is no longer available for adsorption. This greatly reduces the total adsorbent capacity of the filter unit.

BRIEF SUMMARY OF THE INVENTION

A principal object of the invention described in the present disclosure is to propose a process for the production of filter units and of moulded elements of an adsorbent medium, in which the adsorbent capacity of the adsorbent medium is fully preserved, or if possible is even further increased by the binder medium used in making the filter. This process must at the same time be suitable for industrial production and readily controllable by simple processing steps, and provide reproducible and consistent filter properties. According to the invention, these and other objects are being achieved by the following process:

Granules of an adsorbent medium, preferably activated carbon, are mixed with a granular organic thermoplastic binder medium in a dry state; then the dry granular mixture is put in a mould and compacted; within the mould, the mixture is being heated, while substantially excluding air from it, to a temperature well above the plastic range of the binder medium, and the temperature kept at that level until decomposition and at least partial coking of the binder medium occur; finally, the moulded element thus formed is left to cool and is then removed from the mould.

In a filter unit made in this manner, practically the whole of the adsorbent capacity of the material is maintained, i.e. practically the total of the effective surface area and the internal porosity of the granules of adsorbent medium remain available. Moreover, in a given volume of the adsorbent medium, its adsorbent capacity is further increased, because decomposition and partial coking make the organic binding material highly porous at least partially; it becomes "activated" by the thermal treatment in the form and therefore similarly acts as an adsorbent medium. The processing steps are simple, easy to control, and are also suitable for mass production, in that they consist of the dry mixing of the materials, filling of the moulds, compaction, heating by a timer-controlled program, and removal from the moulds.

Various organic thermoplastic materials, such as those also used elsewhere as binders for granules in the manufacture of moulded solid bodies, are suitable as binder media. A granulate of thermoplastic material of high or ultra-high molecular weight is particularly suitable, especially polyethylene which, when heated, becomes cohesive during a viscous transition stage and whose macromolecules form a kind of carbon framework as an extremely fine, open-pored residual structure when most of the material has been thermally decomposed and turned into coke, i.e. after decomposition and expulsion of the volatile components during heating at elevated temperature.

The present invention also relates to a filter unit made in accordance with the process referred to above. Such filter unit according to the invention is characterized in that the granules of the adsorbent medium in the moulded element are fixed in the residual structure of a decomposed and at least partially coked organic binder medium containing open micropores.

Surprisingly, despite the high adsorbent capacity of the moulded element, to which reference has already been made and which is to some extent due to the coked binder medium, the moulded element has proved capable of achieving good mechanical strength despite extensive thermal decomposition of the binder medium, and this strength is perfectly adequate for many types of application. Moreover, even when the material in a moulded element is tightly packed, it produces rather less flow resistance by comparison with the presence of a binder of "intact" synthetic thermoplastic material. This is probably due to the fact that, unlike plastics in general, a coked microporous binder medium is no longer water-repellent.

For applications in which solid or jelly-like impurities present in the filtrate have to be intercepted by surface filtration and kept away from the adsorbent element, an alternative embodiment of the invention is proposed. According to this, a close-fitting porous supporting wall is provided at least on the entry side of the adsorbent element and is made as a mechanical fine filter. This permits the application of reverse flow to flush out the filter unit effectively and repeatedly, and prevents the adsorbent element becoming mechanically blocked or clogged. The close-fitting supporting walls also provide additional mechanical support for the moulded adsorbent element, protect it from impact and compression, prevent the disintegration, breakage, or fissuring of the moulded element, and ensure that the flow of filtrate is spatially well distributed.

Cleaning filters may be made with one or several such filter units, as required. Typical applications are the treatment of drinking water, mains water, and sewage, the beverage, food, and chemical industries, etc., as well as gas purification.

Typical and preferred embodiments of the invention are described in greater detail below and in conjunction with the drawing, as follows:

BRIEF DESCRIPTION OF THE DRAWINGS

FIG. 1 is a part section and part elevation of portion of a first embodiment of a hollow cylindrical filter unit;

FIG. 2 is a longitudinal section of a second embodiment of a filter unit with supporting walls, suitable for use as a built-in unit;

FIG. 3 is a part section and part elevation of a third embodiment of a cleaning filter, made as a hollow cylindrical filter unit, likewise with supporting walls;

FIG. 4 is a part section which shows an alternative version of the filter shown in FIG. 3; and FIG. 5 is a radial section along line V—V in FIG. 4.

DETAILED DESCRIPTION OF THE PREFERRED EMBODIMENTS

The following first describes a typical method for making a filter unit 10, particularly its adsorbent element 8, 8', or 18, and a mechanical fine filter 4 or 14, by reference to its typical steps:

In principle, a mixture of granules of an adsorbent medium, especially activated carbon, is used for the adsorbent element, together with a granular organic thermoplastic binder medium, preferably a granulate of synthetic thermoplastic material, especially polyethylene of high molecular weight; in certain cases, silica gel or some other granular adsorbent medium may be used instead of activated carbon. The ingredients are mixed in the dry state, placed in a mould, and compacted. As far as possible, air is excluded from the mixture in the mould when it is then heated to a temperature well above the plastic range of the binder medium. During heating, the binder medium slowly decomposes at this elevated temperature, which is maintained until the binder medium has turned partly, preponderantly, or totally into coke. After it has cooled sufficiently, the moulded element is removed from the mould. If necessary, the moulded element is then contained between supporting walls on the entry and exit sides respectively.

In order to make moulded elements with special properties, particularly to increase the adsorbent capacity, the binder medium used should preferably consist of granules with open micropores. Before the granulate of the binder medium is mixed with the adsorbent medium, it should preferably be premixed with fine carbon dust.

For example, such a preliminary mixture may consist of about 60% fine carbon dust and 40% binder. The carbon dust is made of finely ground, coked coconut shell; the binder may be a granulate of microporous polyethylene of ultra-high molecular weight with a granule size of less than about 0.1 mm, available commercially as Hostalen GUR 212, made by Hoechst AG, Frankfurt am Main (Germany). These ingredients should be mixed for about 15 minutes at 3000 rpm in a high-speed mixer. High-intensity mixing causes some of the carbon dust to enter the fine pores in the granules of the binder medium and this later contributes to the compactness and adsorbent capacity of the moulded element.

The main mixture consists of about 40% of the preliminary mixture described above and of 60% granular activated carbon, with a granule size from 2 mm to 3 mm, for example made of broken coconut shells. These ingredients should be mixed dry, but at a lower mechanical intensity, so as not to impair the granularity of the granulate. In this process, the fine high-polymer binder granules are at first mixed purely mechanically into the coarsely structured surface of the granules of activated carbon and jammed tightly in the larger pores and their ramifications.

The main mixture is then filled and pressed into a mould whose shape corresponds to that of the finished filter element. The resulting density and adsorbent capacity of the adsorbent element and the pressure drop produced across it depend to a large extent on the pressure applied for compacting the mixture in the mould. The mixture in the mould may also be compacted by vibration, applied alone or in addition to the application of pressure.

After compaction, the dry mixture in the mould is placed in an oven and kept for about an hour and a half at a temperature of 330° to 350° C. To prevent incineration of the binder medium, outside air should as far as possible be excluded during this process, but the gases and vapour produced during decomposition—which will to a large extent displace the air entrapped in the mixture—must be allowed to escape.

In detail, the following happens as the temperature in the mixture of material rises: During the steady temperature rise in the material, the thermoplastic binder medium first of all plasticizes and bonds with the adsorbent material's granules at a transitional temperature range from about 180° to 250° C.; this transitional temperature depends from the material used. Then, as the temperature is further increased, decomposition begins, and emerging volatile gases cause the porous granules of the binder medium to froth. As a result, the binder medium flows into adjacent pores of nearby carbon granules and becomes anchored in them. As long as oxygen from the air is still present in the largely air-tight mould, partial incineration also occurs, whereby the binder medium of high molecular weight decomposes into carbon dioxide and water vapour. As the temperature rises further and the oxygen supply is exhausted, most of the binder medium is smouldered and partly transformed into coke, whereas the basic organic structure of the macromolecules remains to a large extent as an extremely fine carbon framework. The solidified residue of foam from the single granules of binder medium forms a grid structure penetrated by open micropores in which residual structure the carbon granules are fixed. Said residual structure also preserves to a certain amount the binder medium's original granularity and thus leaves open macropores between the granules of the adsorbent medium.

Because the coking process described may be likened to an activation of the organic binder medium, that medium's microporous structure adds to the adsorbent element's adsorbent capacity. But of special importance is the fact that because of decomposition and coking there is only very little clogging of the granules of the adsorbent medium which thus retain their porosity. In general, therefore, a moulded element made by this process has a far denser and more uniform structure and a much greater internal surface area available for effective adsorption than a loose pile of granulate. (Micropores are up to 2 nanometres [$2 \times 10^{-9}$m] in size; macropores have a diameter greater than 50 nm; the size of mesopores lies between these two. Micropores are a major factor that determines the size of the internal surface area where most of the adsorption occurs.)

FIG. 1 shows part of a typical filter unit 10 made as described above. In the main, it is a hollow cylindrical adsorbent element 8 with an internal void 11. The stream of filtrate passes radially through the element, i.e. the cylinder's external surface is the entry side 13 and the internal face to the void 11 is the exit side 15. A cover 21 encloses the end surface of the adsorption element 8 and has a spout 22 by which the clean filtrate can leave.

It is important to note that the internal structure of the adsorbent element 8 consists of interconnected porous granules of an adsorbent medium, especially activated carbon. The manufacturing process described fixes the adsorbent granules in the residual structure of the decomposed and at least partly coked, open-pored organic binder medium containing micropores.

It may be desirable to provide the entry side 13 of the element 8 with a number of peripheral grooves 7 or similar depressions, as shown in FIG. 1. When the grooves 7 are cut in the filter element, the rotating blade of a circular saw or milling device cuts the carbon granules present there and fixed in position in the element, thus these grooves considerably increase the available surface area on the entry side and make it possible for large amounts of solid and jelly-like impurities present in the filtrate to be deposited on the surface without clogging it. Without this surface filtration, the impurities would clog the inside of the adsorbent element 8 and make it unserviceable long before its adsorbent capacity is exhausted. Other embodiments of filters with a hollow cylindrical adsorbent element 18 are described below by reference to FIGS. 3 to 5, but these have supporting walls 14, 16 in addition.

FIG. 2 shows a simple embodiment of a filter unit 10 made as described in the present disclosure: a dot-dashed line indicates a supporting housing or part of an installation 1 of cleaning filter assembly; two arrows indicate the direction of the filtrate through the filter; 3 indicates the entry side for the filtrate and 5 the filter unit's exit side. Depending on the specification for the cleaning filter, i.e. the flow capacity of filtrate, the pressure gradient, etc, several such filter units 10 may be fitted within a cleaning filter assembly or as part of a largescale filter installation, either side by side next to each other, i.e. in parallel in relation to the flow of the flitrate, or in series.

The filter unit 10 shown in FIG. 2 is made up as follows:

A cylindrical housing 2 contains an adsorbent element 8' of the type described above; this element is contained between a close-fitting porous supporting wall 4 on the entry side and another, similar supporting wall 6 on the exit side. Components 4, 6, and 8' should fit tightly inside the tubular housing, for example by being glued into it, to prevent any part of the flow bypassing the filter. At least the supporting wall 4 on the entry side is made as a mechanical fine filter; the supporting wall 6 on the exit side may be similarly made. The latter may also have a larger pore size or be made as a perforated plate or similar, in accordance with the specified requirements. The close-fitting supporting walls 4 and 6 give the porous moulded element 8 adequate mechanical support to prevent it from fissuring or breaking, for example when subjected to impact.

The cleaning filter shown in FIG. 3 is designed especially for the treatment of domestic drinking water, but is clearly also suitable for many other applications. A filter unit 10 fits in a filter housing that has a base section with a housing wall 23, bottom 24, and an inlet 25. The filter unit screws to the base section and has a lid 21' with a spout 22'. The void 19 formed by the housing provides space for other filter material, such as a ion-exchange granulate.

The filter unit 10 is substantially hollow cylindrical in shape; it has an outer enclosing tube 14 and an inner core tube 16; these mantling tubes 14, 16 act as close-fitting porous supporting walls for the adsorbent element 18 between them. The top of the filter unit 10 fits tightly under the lid 21', and its bottom is tightly closed by a cover plate 12, in order to force the filtrate to enter by way of the outer surface 13 of the supporting wall 14 and leave via the inner surface 15 of the supporting wall 16 and the central void 11. To ensure a tight fit between the moulded element 18 and the supporting walls 14 and 16, these components may also be shaped as hollow cones. A tight mechanical fit of the supporting walls, or enclosing and core tubes that support the moulded element, is also obtainable by other means in the manufacture of the filter unit, as described below. The supporting wall on the entry side, i.e. the enclosing tube 14, is again made as a mechanical fine filter, preferably as a sintered element, and the moulded element 18, i.e. the adsorbent element, has the same main properties as those attributed to the adsorbent element described in connection with FIG. 1. The supporting wall 16 on the exit side, i.e. the core tube, can likewise be made as a sintered element, but it may also be made otherwise, for example of perforated pipe or wire mesh.

In principle, the supporting walls that enclose the moulded elements 8' and 18 on the entry and exit sides respectively can be made as separate components. However, good fitting over the entire surface common to the supporting wall and the adsorbent element is desirable, especially for the entry-side supporting wall that serves as a mechanical fine filter. If the fine filter is a sintered element, the contact surfaces can be sintered at the time the filter is made, as follows:

The adsorbent element removed from its mould as described above is placed in a second mould that leaves a space for the entry-side supporting wall and, if applicable, also for the exit-side supporting wall. For example, for a filter unit 10 made in accordance with FIG. 3, a granulate suitable for sintering, preferably again type GUR 212, is filled into and compacted by vibration in the space left for the hollow cylinder of the supporting wall 14, whose thickness may vary from about 5 mm to 20 mm according to type and function. The adsorbent element thus backfilled with polyethylene granulate is then placed in an oven, in order to sinter the granulate for at least an hour tat a temperature of at least 180° C. The temperature should be controlled in such a manner as to ensure that there is no fusion within the supporting wall's volume or any impairment of the adsorbent element's structure, for example by incineration. Sintering produces a mechanical fine filter, with a maximum pore diameter of about 4 μm and a filter fineness of about 1 μm. This fine filter serves as a fixed supporting wall which is surface-sintered to the adsorbent element. The same sinter material may also be used for the exit-side supporting wall 16, but this should be made as a prefabricated length of tube with walls about 5 mm thick and slipped axially into place in the adsorbent element. As described above, this wall need not necessarily act as a fine filter and can thus have larger pores.

On the entry side, i.e. in its mechanical fine filter, a filter unit made in this manner can retain solid, flocculate, or jelly-like particles of at least 1 μm in diameter held in suspension in the filtrate. Hence such particles, including most bacteria, cannot reach the adsorbent element and thus allow this to act purely as an adsorbent to eliminate impurities in solution, such as flavouring agents, pigments, and the like. A high adsorbent capacity and an adequate flow of filtrate can be achieved overall. In a filter unit made as shown in FIG. 3 and as described above, with a length of about 110 mm and a diameter of about 100 mm, the measured water flow obtained at a supply pressure of 4 bar was about 1.5 litres per minute.

Also, because there is practically no deep filtration, the filter unit can be flushed very effectively by reverse flow. Reverse-flow flushing can, of course, be readily carried out by forcing water or compressed air in the reverse direction. Because, as a rule, there is no need to flush out the adsorbent element or the exit-side supporting wall by reverse flow, preferably only the mechanical fine filter itself should be flushed, and for this purpose an embodiment such as that shown in FIGS. 4 and 5 is particularly suitable.

In the embodiment shown in FIGS. 4 and 5, the supporting wall 14' is made somewhat thicker and has a number of longitudinal holes 28 distributed about its circumference, which extend from the top face down to the bottom but are closed at the lower end face of the wall 14'. A circular groove 29 in the lid 21' connects all the holes 28 with one another. The lid is made with a tube connection 30 for the reverse-flow flushing medium, preferably compressed air; the tube 30 connects with the circular groove 29. Inside or outside the tube 30, there is provision for a reflux or check valve (not shown). The pressure of the reverse-flow flushing medium introduced through the tube 30 is thus distributed to all the channels 28 and by these throughout the length of the supporting wall. Preferably, longitudinal grooves should be formed between the holes 28 and likewise extend over the full length of the supporting wall, but should stop short of the top face, as shown in FIG. 4. Such grooves 27 considerably increase the effective entry surface of the fine filter and also facilitate the exit of the compressed air used as the medium in reverse-flow flushing.

Clearly, other forms of construction are also feasible as typical embodiments of the cleaning filters described; similarly, the process stages described here are given as typical examples only, but other versions of these are also feasible. For example, the fine-filter unit of the mechanical fine filter should be made to suit the purposes of the intended application and the minimum size of the solid particles present in the filtrate; the determining factor for the fine filter is always that such particles must be prevented from reaching and clogging the adsorbent element. For example, instead of a granulate of plastic material suitable for sintering, other materials such as porous ceramics may also be appropriate for the fine filter and/or supporting walls. Where the filtrate must meet special requirements as regards sterility, the fine filter and/or the two supporting walls may be "impregnated" with a bactericidal product, such as finely distributed silver. Further, a different organic binder medium may also be used in the adsorbent element, and the procedure followed in mixing and particularly the temperature control for decomposition and coking altered accordingly. It is always essential that, in its finished state, the binder medium must not—or, if so, only slightly—clog the pores of the granulate of adsorbent medium within the moulded element, and must be decomposed to such an extent and, if possible, also at least partly turned into coke and thus "activated", that it also becomes at least partially adsorbent.

I claim:

1. Process for the manufacture of a filter unit made as a moulded adsorbent element permeable to gases and liquids, comprising the following steps:

mixing, in a dry state, granules of an adsorbent medium and a granular organic thermoplastic binder medium to form a dry granular mixture;

placing the dry granular mixture into a mould and compacting it;

heating the mixture in the mould, while substantially excluding air from it, to a temperature of from about 330° C. to about 350° C., and maintaining said temperature until decomposition and at least partial coking of said binder medium occur to form a grid structure penetrated by open micropores and to fix the granules of the adsorbent medium in the grid structure. said grid structure partially preserving the granularity of the binder medium and forming open macropores between the granules of the adsorbent medium;

and allowing the moulded element to cool and then removing the element from the mould.

2. Process according to claim 1, wherein the binder medium used is polyethylene of high molecular weight.

3. Process according to claim 1, wherein a granulate of a binder medium is used whose granules have open micropores.

4. Process according to claim 3, wherein a preliminary mixture of the granulate of binder medium and fine carbon dust is prepared before the binder medium is mixed with the adsorbent medium.

5. Process according to claim 1, wherein the moulded adsorbent element is further characterized as having a flitrate-entry side and the flitrate-entry side of the moulded element, in order to increase its surface area, is provided with grooveshaped depressions.

6. Process according to claim 1, wherein the moulded adsorbent element is further characterized as having a flitrate-entry side and wherein a porous supporting wall is provided as a mechanical fine filter at least on the flitrate-entry side of the adsorbent moulded element.

7. Process according to claim 6, wherein said supporting wall is a sintered element.

8. Process according to claim 7, wherein, after removal of the moulded adsorbent element from its mould, said element is placed within a second mould that determines the shape of the supporting wall, a space around the adsorbent element and within the second mould is filled with a granulate that becomes sintered with heat, and said granulate is sintered within itself and with the adsorbent element.

9. Process according to claim 8, wherein a synthetic thermoplastic material is used as the granulate for sintering.

10. Process according to claim 9, wherein the synthetic thermoplastic material is polyethylene.

11. Process according to claim 1 wherein the adsorbent medium is activated carbon.

\* \* \* \* \*